Patented Aug. 26, 1930

1,774,221

UNITED STATES PATENT OFFICE

CHARLIE BAUERSACHS, OF CRAWFORD, NEBRASKA

POLISHING COMPOUND

No Drawing. Application filed November 22, 1928. Serial No. 321,273.

This invention relates to a polishing compound designed especially for use upon paint or varnish finished surfaces.

The primary object of the present invention is to provide an improved polishing compound which will act, in addition to cleaning and restoring the luster to a finished surface, to fill out and restore cracked or broken places in the finish to which it is applied.

Another object of the invention is to provide a polishing compound which will leave a film or coating over the surface to which it is applied, of glassy hardness and luster, which will not crack, check or fade when exposed to rain and sun.

Still another object of the invention is to provide an improved polishing compound which will not leave an oily surface, will not collect dirt or dust and which dries out practically instantaneously when applied.

The compound consists of a mixture of raw linseed oil, varnish, tartaric acid, alum, citric acid, arabic acid and vinegar.

The linseed oil in the compound acts to soften to a certain extent the old paint or varnish surface to which the paint is applied and to give luster to the new surfaces formed.

The varnish, which is preferably of a very good grade, hardens the finish and coacts with the oil to preserve the luster produced thereby.

The tartaric acid, the citric and arabic acids all coact to produce the desired lusterous surface, while the alum acts to dry the polish and form a glassy surface or coat.

In compounding or preparing the polish I preferably take the ingredients in the following approximate proportions:—

Raw linseed oil_____ 1 quart,
Varnish _____ 4 fluid ounces,
Tartaric acid _____ 1 ounce,
Powdered alum _____ 1 ounce,
Citric acid_____ 1 ounce,
Arabic acid_____ 1 ounce,
Vinegar_____ 1 ounce.

In mixing the foregoing ingredients the citric acid and arabic acid are first mixed together and dissolved in the vinegar after which this mixture is incorporated with the previously mixed oil, varnish, tartaric acid and alum, the alum being used in powdered form. This procedure of mixing must be followed in order to obtain the compound in the proper finished condition.

When the polish is to be used, approximately two ounces thereof is mixed with a quart of warm water and stirred well thereinto. The polish cloth to be used is then dipped into this solution and wrung out to a nearly dry condition in which condition it is rubbed over the surfaces of the article to be polished.

A polish compounded in the manner described, from the ingredients set forth, when used as described, will give to the surface to which it is applied a hard lusterous finish which will not be affected by rain, sun or by washing. In addition to this this polishing compound may be used freely without injury to the hands.

While the formula given calls for raw linseed oil as this has been found to be preferable to boiled oil, it is, of course, to be understood that boiled oil may be used and applicant does not therefore, wish to limit himself in this manner. It has also been found that any type of alum may be employed in this formula with satisfactory results, however, because of its cheapness potash-alum is preferably used.

Having thus described my invention, what I claim is:—

1. A polish of the character described comprising a vegetable oil, a varnish, alum, tartaric, citric and arabic acids, and vinegar.

2. A polishing compound consisting of a mixture of linseed oil, varnish, alum, tartaric, citric and arabic acids, and vinegar.

3. A polishing compound designed to be mixed with water for use consisting of a mixture of linseed oil, varnish, alum, tartaric, citric and arabic acids and vinegar.

4. A polishing compound consisting of a mixture of the following ingredients taken in the accompanying approximate proportions:

| | |
|---|---|
| Raw linseed oil | 1 quart, |
| Varnish | 4 fluid ounces, |
| Tartaric acid | 1 ounce, |
| Powdered alum | 1 ounce, |
| Citric acid | 1 ounce, |
| Arabic acid | 1 ounce, |
| Vinegar | 1 ounce, |

In testimony whereof I hereunto affix my signature.

CHARLIE BAUERSACHS.